United States Patent Office 3,462,457
Patented Aug. 19, 1969

3,462,457
CARBAMATES AND CARBANILATES OF 11-HY-
DROXY - 10,5(EPOXYMETHANO)DIBENZOCY-
CLOHEPTEN-13-ONE
Martin A. Davis, Montreal, Quebec, and Thomas A. Dobson, St. Laurent, Quebec, Canada, assignors to American Home Products Corporation, New York, N.Y., a corporation of Delaware
No Drawing. Filed Dec. 28, 1966, Ser. No. 606,519
Int. Cl. C07d 9/00, 29/12, 27/02
U.S. Cl. 260—343.2                              4 Claims

ABSTRACT OF THE DISCLOSURE

There are disclosed herein the compounds 11-carbamoyloxy-, 11 - N - methyl-carbamoyloxy, 11-N,N-dimethyl-carbamoyloxy-, 11-N-ethyl-carbamoyloxy-, 11-N-propyl-carbamoyloxy-, 11-N-butyl-carbamoloxy-, 11-N-phenyl-carbamoyloxy-, 11-N-benzyl-carbamoyloxy-, 11-N-phenethyl-carbamoyloxy-, 11-(N-p-chlorobenzyl)-carbamoyloxy-, 11-N-(1-naphthyl)-carbamoyloxy-, 11-pyrrolidino-carbonyloxy-, 11-piperidino-carbonyloxy-, 11-morpholino-carbonyloxy-, and 11 - N' - ethylpiperazino-carbonyloxy - 10,5(epoxymethano)10,11 - dihydro-5H-dibenzo[a,d]cyclohepten-13-one. The compounds are useful as trichomonicidal agents and are prepared by reacting 11 - hydroxy-10,5(epoxymethano)-10,11-dihydro-5H-dibenzo[a,d]cyclohepten-13-one with either an appropriate hydrocarbon isocyanate or an aryl chloroformate and, in the latter case, reacting the product obtained with an appropriate amine. There is also disclosed the intermediate compound 11 - phenoxycarbonyloxy - 10,5 (epoxymethano) - 10,11 - dihydro-5H-dibenzo[a,d]cyclohepten-13-one.

---

This invention relates to novel chemical compounds having useful biological properties. More particularly, this invention relates to novel carbamates and carbanilates of 11 - hydroxy-10,5(epoxymethano)-10,11-dihydro-5H-dibenzocyclohepten-13-one of the following Formula I

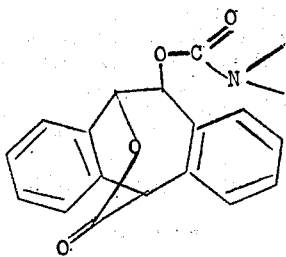

I wherein R and R' represent hydrogen, a lower alkyl group containing from 1–4 carbon atoms, aralkyl and halogen-substituted aralkyl groups containing from 7–8 carbon atoms, or aryl groups containing from 6–10 carbon atoms. In addition, the group NRR' may represent part of a heterocyclic ring, optionally containing an additional hetero atom, and containing from 4–6 carbon atoms and from 1–2 hetero atoms, such as, for example, pyrrolidine, piperidine, morpholine or N'-ethylpiperazine. Exemplary of the lower alkyl, aralkyl, substituted aralkyl and aryl substituents are the methyl, ethyl, propyl, butyl, benzyl, phenethyl, p-chlorobenzyl, phenyl, and naphthyl groups.

The compounds of Formula I may be prepared in the following manner: Those compounds in which R represents hydrogen and R' is as defined above may be secured by the action of an alkyl-, aralkyl-, or arylisocyanate of the formula R'NCO on 11-hydroxy-10,5 (epoxymethano)-10,11-dihydro - 5H-dibenzo[a,d]cyclohepten-13-one of Formula II. The reaction is conveniently carried out in an inert solvent such as, for example, anhydrous dioxane or benzene optionally containing a small quantity of a tertiary organic base such as, for example, pyridine. The reaction mixture is left at room temperature for a period of time sufficient to effect completion of the reaction such as, for example, sixteen hours. The product is then separated and purified in the conventional manner.

Alternatively, for those compounds in which R and R' have all the significances defined in the first instance, the following method may be employed: The 11-hydroxy compound of Formula II is treated with an aryl chloroformate, preferably phenyl chloroformate of the formula $C_6H_5OCOCl$. The reaction is conveniently carried out in an acid-binding solvent such as, for example, pyridine, and is performed at room temperature for a period of time sufficient to effect the condensation, such as, for example, 2 to 10 hours. The product is isolated and purified in a conventional manner to afford 11-phenoxycarbonyloxy - 10,5(epoxymethano)10,11 - dihydro - 5H-dibenzo[a,d]cyclohepten-13-one of Formula III. This last-mentioned intermediate is then interacted with ammonia or an organic amine of the formula HNRR', wherein R and R' and NRR' are as defined above. The reaction is carried out at temperatures ranging from —30 to +30° C. and the desired product of Formula I is isolated and purified in a conventional manner.

The requisite starting material for the compounds of this invention, i.e., the hydroxy compound of Formula II, may be prepared as described in our co-pending U.S. application S.N. 539,640, filed Apr. 4, 1966, now Patent 3,361,767 issued Jan. 2, 1968. Briefly, this process entails the treatment of 5H-dibenzo[a,d]cycloheptene-5-carboxamide, prepared as described by M. A. Davis et al. in J. Med. Chem. 7, 88 (1964), with one molar proportion of bromine. The resulting product is then warmed with water or an aqueous alkanol to furnish 11-bromo-10,5(epoxymethano)10,11 - dihydro - 5H - dibenzo[a,d] cyclohepten-13-one, which is then interacted with liquid ammonia to furnish 10,11-epoxy-10,11-dihydro-5H-dibenzo[a,d]cycloheptene-5-carboxamide. This compound, in turn, is treated with a mineral acid, preferably aqueous sulfuric acid, to furnish a mixture of the lower and higher-melting geometrical isomers of the desired 11-hydroxy-10,5(epoxymethano)10,11-dihydro - 5H-dibenzo [a,d]cyclohepten-13-one of Formula II.

The novel compounds of Formula I have useful biological properties and are of value as medicaments. They have activity against the parasitic organism *Trichomonas foetus* and are trichomonacidal agents. For this purpose, they may be formulated with suitable excipients as vaginal suppositories or vaginal inserts, each containing from 50–500 mg. of the active ingredient and may be administered once to four times daily for periods of time of from two to four weeks.

The following formulae and descriptive examples will illustrate our invention.

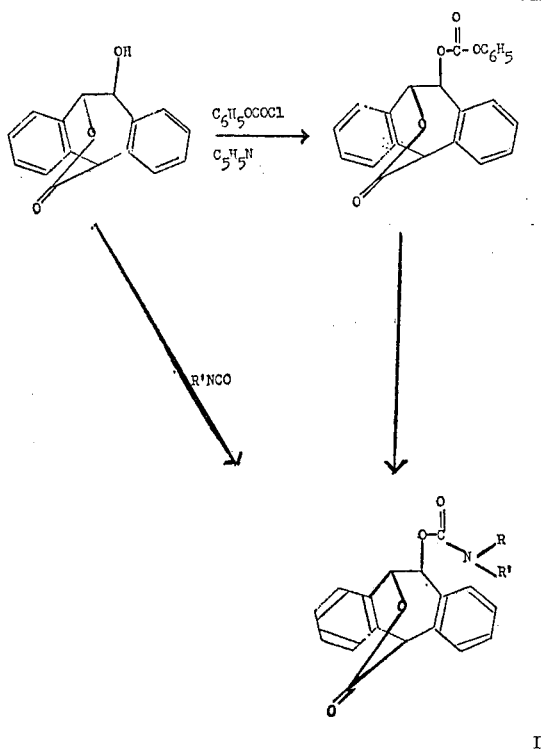

Example 1.—11 - phenoxycarbonyloxy - 10,5(epoxymethano) - 10,11-dihydro-5H-dibenzo[a,d]cyclohepten-13-one (III)

A solution of 11-hydroxy-10,5(epoxymethano)10,11-dihydro-5H-dibenzo[a,d]cyclohepten-13-one (1.0 g., 0.004 mole) in dry pyridine (10 ml.) is treated with cooling and stirring with phenyl chloroformate (0.76 g., 0.005 mole). The solution is then stirred at room temperature for three hours and diluted with water (30 ml.). The precipitated oil solidifies and is filtered off to furnish 1.6 g. of the title product. Recrystallization from ethanol furnishes a purified sample, M.P. 165–166° C. Elemental analysis confirms the empirical formula $C_{23}H_{16}O_5$ of the title compound.

Example 2.—11 - carbamoyloxy-10,5(epoxymethano)10, 11-dihydro-5H-dibenzo[a,d]cyclohepten - 13 - one (I, R=R'=H)

A solution of the phenyl carbonate ester prepared as described in Example 1 (1.0 g.) in dry ether (75 ml.) is treated with liquid ammonia (75 ml.). The mixture is allowed to stand at ambient temperature for two hours, allowing the ammonia to evaporate. The precipitated product is removed by filtration and washed with a little ether to furnish 0.9 g. of the title product. Recrystallization from a mixture of dioxane and ether furnishes the title compound with M.P. 263–265° C. Elemental analysis confirms the empirical formula $C_{17}H_{13}NO_4$.

Proceeding as described above, but substituting ammonia by methylamine, dimethylamine, propylamine, benzylamine, pyrrolidine, piperidine, morpholine, or N'-ethylpiperazine, the corresponding 11-N-methyl-, 11-N,N-dimethyl-, 11-N-propyl-, or 11-N-benzyl-carbamoyloxy- and the corresponding 11-pyrrolidino-, 11-piperidino-, 11-morpholino- or 11-N'-ethylpiperazino-carbonyloxy-10,5 (epoxymethano) - 10,11 - dihydro-5H-dibenzo[a,d]cyclohepten-13-ones are obtained.

Example 3.—11 - (N-phenyl)carbamoyloxy - 10,5(epoxymethano)10,11-dihydro - 5H-dibenzo[a,d]cyclohepten-13-one (I, R=H, R'=C₆H₅)

A solution of 11-hydroxy-10,5(epoxymethano)10,11-dihydro - 5H - dibenzo[a,d]cyclohepten-13-one (1.0 g., 0.004 mole) in dry benzene (10 ml.) containing dry dioxane (2.0 ml.), is treated with phenyl isocyanate (0.48 g., 0.004 mole) and two drops of dry pyridine. The solution is left at room temperature overnight, treated with water (25 ml.) and the benzene layer is separated, washed with water, dried and concentrated in vacuo. The residual material is recrystallized from ethanol to furnish the title product with M.P. 240–241° C. The empirical formula $C_{23}H_{17}NO_4$ is confirmed by elemental analysis.

Proceeding as directed above, but substituting the phenyl isocyanate by methyl, ethyl, propyl, butyl, benzyl, phenethyl, p-chlorobenzyl, or 1-naphthylisocyanate, the corresponding 11-N-methyl-, N-ethyl-, N-propyl-, N-butyl-, N-benzyl, N-phenethyl-, N-(p-chlorobenzyl)- or N - (1-naphthyl)-carbamoyloxy - 10,5(epoxymethano)10, 11-dihydro-5H-dibenzo[a,d]cyclohepten-13-ones are obtained.

We claim:
1. A compound selected from the group consisting of 11 - carbamoyloxy - 10,5(epoxymethano)10,11-dihydro-5H - dibenzo[a,d]cyclohepten - 13-one,11 - N - methylcarbamoyloxy - 10,5(epoxymethano)10,11 - dihydro-5H-dibenzo[a,d]cyclohepten - 13 - one,11 - N,N-dimethylcarbamoyloxy - 10,5(epoxymethano)10,11 - dihydro-5H-dibenzo[a,d]cyclohepten - 13 - one,11-N-ethyl-carbamoyloxy - 10,5(epoxymethano)10,11 - dihydro - 5H-dibenzo[a,d]cyclohepten - 13 - one,11 - N - propylcarbamoyloxy-10,5(epoxymethano)10,11 - dihydro - 5H - dibenzo[a,d]cyclohepten - 13 - one,11 - N - butylcarbamoyloxy-10,5(epoxymethano)10,11-dihydro - 5H - dibenzo[a,d]cyclohepten - 13 - one,11-N-phenylcarbamoyloxy-10,5(epoxymethano)10,11 - dihydro - 5H-dibenzo[a,d]cyclohepten-13 - one,11-N-benzyl-carbamoyloxy-10,5(epoxymethano) 10,11 - dihydro - 5H - dibenzo[a,d]cyclohepten - 13-one, 11 - N - phenethyl-carbamoyloxy - 10,5(epoxymethano) 10,11 - dihydro - 5H - dibenzo[a,d]cyclohepten - 13-one, 11 - (N-p-chlorobenzyl) - carbamoyloxy - 10,5(epoxymethano)10,11 - dihydro - 5H-dibenzo[a,d]cyclohepten - 13 - one,11 - N - (1-naphthyl)-carbamoyloxy-10,5(epoxymethano)10,11 - dihydro - 5H - dibenzo[a,d]cyclohepten - 13 - one, and 11 - pyrrolidino-carbonyloxy - 10,5(epoxymethano)10,11 - dihydro - 5H - dibenzo[a,d]cyclohepten - 13 - one,11 - piperidino-carbonyloxy-10,5(epoxymethano) 10,11 - dihydro - 5H - dibenzo[a,d]cyclohepten-13-one, 11 - morpholino - carbonyloxy - 10,5(epoxymethano)10, 11 - dihydro - 5H-dibenzo[a,d]cyclohepten-13-one, and 11 - N'-ethylpiperazino-carbonyloxy-10,5(epoxymethano) 10,11 - dihydro - 5H - dibenzo[a,d]cyclohepten-13-one.

2. 11 - carbamoyloxy - 10,5(epoxymethano)10,11 - dihydro-5H-dibenzo[a,d]cyclohepten-13-one.

3. 11-(N-phenyl)carbamoyloxy - 10,5(epoxymethano) 10,11-dihydro-5H-dibenzo[a,d]cyclohepten-13-one.

4. 11 - phenoxycarbonyloxy - 10,5(epoxymethano)10, 11-dihydro-5H-dibenzo[a,d]cyclohepten-13-one.

References Cited

UNITED STATES PATENTS 3,391,163 7/1968 Dobson et al. _____ 260—343.2

JAMES A. PATTEN, Primary Examiner

U.S. Cl. X.R.

260—247.2, 268, 294.3, 326.3; 424—248, 250, 267, 274, 279